United States Patent [19]
Yoshida et al.

[11] Patent Number: 5,528,506
[45] Date of Patent: Jun. 18, 1996

[54] FEED RATE CONTROL METHOD AND APPARATUS IN NUMERICAL CONTROL SYSTEM

[75] Inventors: Jun Yoshida; Akira Kawana; Masashi Tanuma; Nobuo Kurisaki; Norio Mori, all of Kanagawa-pref., Japan

[73] Assignee: Makino Milling Machine Co., Ltd., Tokyo, Japan

[21] Appl. No.: 510,771

[22] Filed: Aug. 3, 1995

Related U.S. Application Data

[62] Division of Ser. No. 931,982, Aug. 19, 1992, abandoned.

[30] Foreign Application Priority Data

| Aug. 30, 1991 | [JP] | Japan | 3-244214 |
| Oct. 30, 1991 | [JP] | Japan | 3-314022 |
| Oct. 30, 1991 | [JP] | Japan | 3-314023 |
| Nov. 20, 1991 | [JP] | Japan | 3-331399 |

[51] Int. Cl.$^6$ .................................................. G05B 19/416
[52] U.S. Cl. ............................ 364/474.300; 364/474.290; 318/571.000
[58] Field of Search ............................ 364/167.01–174, 364/153, 474.12, 474.15, 474.16, 474.28–474.31, 191, 192; 318/561, 567, 571, 573

[56] References Cited

U.S. PATENT DOCUMENTS

| 4,543,625 | 9/1985 | Nozawa et al. | 364/474.3 |
| 4,894,594 | 1/1990 | Kawamura et al. | 318/567 |
| 5,200,680 | 4/1993 | Sasaki et al. | 318/571 |

FOREIGN PATENT DOCUMENTS

| 62-130411 | 6/1987 | Japan | 364/474.29 |
| 2-195409 | 8/1990 | Japan. | |

*Primary Examiner*—Roy N. Envall, Jr.
*Assistant Examiner*—Steven R. Garland
*Attorney, Agent, or Firm*—Foley & Lardner

[57] ABSTRACT

The tolerable maximum feed rate Fd is calculated in real time during operation based on the tolerable minimum moving time Ta to be determined by the data interpretation and the moving distance L of each machining block. If the command feed rate Fc exceeds the tolerable maximum feed rate Fd, the actual feed rate for the block is set to the tolerable maximum feed rate Fd, thereby realizing smooth deceleration and preventing mechanical shock of the machine tool and reduction in machining accuracy. Required time for each processing element is determined in advance, the sum of processing times corresponding each element is calculated by judging the processing mode element contained in machining for each block. Then, the feed rate is controlled by determining the tolerable minimum moving time for each block based on the calculated sum of processing times.

13 Claims, 13 Drawing Sheets

FIG. 9

| ELEMENT | CONTENT | PROCESSING TIME |
|---|---|---|
| E 0 | G 0 1 (LINEAR INTERPOLATION) SINGLE-AXIS COMMAND | T 0 |
| E 1 | G 0 1 (LINEAR INTERPOLATION) DOUBLE-AXIS COMMAND | $\alpha 1$ |
| E 2 | G 0 1 (LINEAR INTERPOLATION) THREE-AXIS COMMAND | $\alpha 2$ |
| E 3 | G 0 2 × G 0 3 (ARCUATE INTERPOLATION) | $\alpha 3$ |
| E 4 | G 0 2 × G 0 3 + SINGLE-AXIS COMMAND (HELICAL INTERPOLATION) | $\alpha 4$ |
| E 5 | G 0 2 × G 0 3 + DOUBLE-AXIS COMMAND (HELICAL INTERPOLATION) | $\alpha 5$ |
| E 6 | G 4 1 × G 4 2 (CORRECTION OF TOOL DIAMETER) | $\alpha 6$ |
| E 7 | G 4 3 (CORRECTION OF TOOL LENGTH) | $\alpha 7$ |
| E 8 | G 5 2 ~ G 5 9 (COMMAND OF COORDINATE) | $\alpha 8$ |
| E 9 | G 9 0 (ABSOLUTE COMMAND) | $\alpha 9$ |
| E 10 | G 2 0 (INCH INPUT) | $\alpha 10$ |
| E 11 | G 5 1.1 (MIRROR IMAGE) | $\alpha 11$ |
| E 12 | G 6 8 (ROTATION OF COORDINATE) | $\alpha 12$ |
| E 13 | G 5 1 (SCALING) | $\alpha 13$ |
| ⋮ | ⋮ | ⋮ |
| E 20 | SIMULTANEOUS 4-AXIS CONTROL | $\alpha 20$ |
| E 21 | SIMULTANEOUS 5-AXIS CONTROL | $\alpha 21$ |
| E 22 | DIALOGUE-TYPE EDITION FUNCTION | $\alpha 22$ |
| ⋮ | ⋮ | ⋮ |

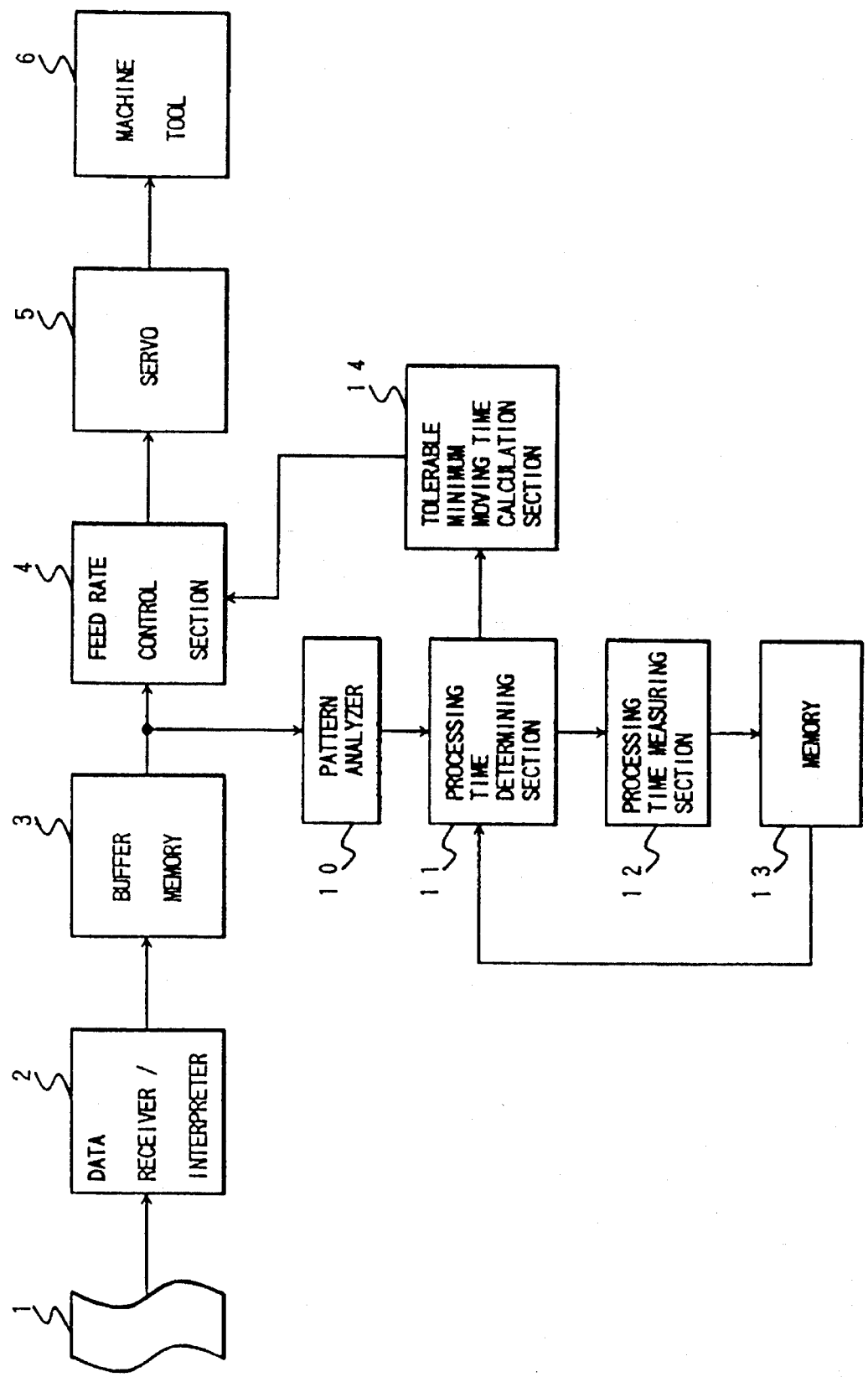

FIG. 12

[NC PROGRAM]

| | | FUNCTION PATTERN | PROCESSING TIME TO BE USED | MEASURED PROCESSING TIME |
|---|---|---|---|---|
| #1 | G01 G91 F4000 X100. ; | SINGLE-AXIS LINEAR INTERPOLATION···PATTERN 1 | $T_0$ | $T_{P1}$ |
| #2 | Y100. ; | SINGLE-AXIS LINEAR INTERPOLATION···PATTERN 1 | $T_{P1}$ | NO REQUIREMENT FOR MEASURE |
| #3 | X50. Y-15. ; | DOUBLE-AXIS LINEAR INTERPOLATION···PATTERN 2 | $\alpha \cdot T_0$ | $T_{P2}$ |
| #4 | G02 X100. I50. ; | ARCUATE INTERPOLATION ···PATTERN 3 | $\alpha \cdot T_0$ | $T_{P3}$ |
| #5 | G01 G41 D1 Y-100. ; | SINGLE-AXIS LINEAR INTERPOLATION+CORRECTION OF TOOL DIAMETER···PATTERN 4 | $\alpha \cdot T_0$ | $T_{P4}$ |
| #6 | X-50. Y30. ; | DOUBLE-AXIS LINEAR INTERPOLATION+CORRECTION OF TOOL DIAMETER···PATTERN 5 | $\alpha \cdot T_0$ | $T_{P5}$ |
| #7 | X20. Y10. ; | DOUBLE-AXIS LINEAR INTERPOLATION+CORRECTION OF TOOL DIAMETER···PATTERN 5 | $T_{P5}$ | NO REQUIREMENT FOR MEASURE |
| #8 | G40 X20. ; | SINGLE-AXIS LINEAR INTERPOLATION+CORRECTION OF TOOL DIAMETER···PATTERN 4 | $T_{P4}$ | |
| #9 | X100. Y10. ; | DOUBLE-AXIS LINEAR INTERPOLATION···PATTERN 2 | $T_{P2}$ | |
| #10 | G02 X50. I25. ; | ARCUATE INTERPOLATION ··· PATTERN 3 | $T_{P3}$ | |
| #11 | X20. ; ······ | SINGLE-AXIS LINEAR INTERPOLATION···PATTERN 1 | $T_{P1}$ | |

FEED RATE CONTROL METHOD AND APPARATUS IN NUMERICAL CONTROL SYSTEM

This application is a division of application Ser. No. 07/931,982, filed Aug. 19, 1992, now abandoned.

BACKGROUND OF THE INVENTION

The present invention relates to feed rate control method and apparatus in numerical control system, more specifically to feed rate control method and apparatus in numerical controlled machine tool capable of performing high precision and smooth operation. Also, the present invention relates to feed rate control method and apparatus in numerical control system with minimum shock in continuous machining of small machining blocks and capable of high speed machining.

As computer technology and numerical control technique progress, significant improvements are seen in machining speed and accuracy based on numerical control using computers. Apparatus capable of performing various curved surface machining such as free curved surface, etc. are commercially available.

A numerically controlled machine tool interprets the machining data (shape data) of the workpiece to be machined by reading an NC tape or other recording media. A path of movement and feed rate of a cutting tool are set for each machining block or machining unit based on the Interpreted data.

In one example, disclosed in U.S. Pat. No. 4,894,594 or European Patent application (Publication number 299080) is an acceleration/deceleration control apparatus for automatically decelerating by reading the feed rate previously set in an NC program in advance and determining where to start deceleration so that the feed rate is always less than the specified feed rate for the machining block at the start position of the machining block. Although the deceleration operation is automatic, there remains the time consuming effort to set the feed rate in the NC program.

As described before, in the conventional numerical control system, machining modes such as the path of a cutting tool, feed rate, etc. are set based on the data read out of recording media such as an NC tape.

However, machining shapes of the workpiece to be machined are non-uniform and the time required for processing each machining block varies over a wide range. On the other hand, there requires a certain time for the numerical control system to interpret the data depending on its processing speed. This means that the data interpretation of one machining block must be completed before actual processing of the one machining block. In order to meet the requirement, it was the conventional technique to provide a buffer memory to save the interpreted data for a plurality of blocks so that the saved data is made available from the buffer memory for machining without causing time lag.

It is to be noted, however, that the memory capacity of the buffer memory is limited and is normally minimized for simplicity or cost reduction purpose. If there is no residual memory capacity of the buffer memory, there may be a case where the required interpretation data is not entered before actual machining if the processing time for a machining block is shorter than the interpretation time, i.e., if the machining portion is very short.

Illustrated in FIG. 4 is the path of the machining tool (program command path) in an example of linear machining of machining blocks N1 through N12 at a constant program command feed rate Fc. An arrow for each block represents the direction and its length represents the distance of movement of the tool. The blocks N11 and N12 show deceleration steps for machining corners.

Illustrated in FIG. 5 is the change of the program command feed rate Fc in the machining steps in FIG. 4. In this example, Fc is constant, thereby shortening the operation time as the machining becomes shorter.

Accordingly, if the program operation time for each block is shorter than the minimum time of movement Ta as illustrated in FIG. 6, a movement command pulse is not in time, thereby causing the feed rate to change in a step manner. As a result the feed rate becomes noncontinuous to cause mechanical shock in the machining tool. This will result in poor machining accuracy.

On the other hand, disclosed in Japanese patent laid-open No. 195409/90 is a feed rate control method capable of easing the load to the machine and feed motor without degrading machining efficiency in a machining program containing both small and large blocks of movement. This is a feed rate control method for a numerical control system to control the feed rate of the tool along the instructed path in accordance with a machining program. It features in comprising the steps of calculating a proper feed rate at command path corners between blocks decelerating the feed rate of the tool to the proper feed rate until the start point of the block is reached in a case where the distance of movement of the block is larger than a predetermined value, accelerating the feed rate of the tool from the start point of the block to reach the maximum feed rate, and setting the feed rate of the tool during the movement in the block within the range between the proper feed rate at the start point of the block and the proper feed rate at the end point in a case where the distance of movement of the block is smaller than a predetermined value.

There is no technical idea in this prior art to introduce the tolerable minimum movement time Ta taking the processing speed in the numerical control system into consideration. Accordingly, it contains the inconvenience as illustrated in FIG. 6.

It is therefore an object of the present invention to provide a method and apparatus for controlling feed rate in numerical control system to realize always stable and highly accurate machining regardless of the length of each machining block.

It is another object of the present invention to provide a feed rate control method in numerical control system capable of minimizing the tolerable minimum moving time and achieving high speed machining.

It is still another object of the present invention to provide a feed rate control method in numerical control system capable of avoiding mechanical shock even if a series of small machining blocks may exist and also capable of high speed machining.

SUMMARY OF THE INVENTION

In accordance with the present invention, the moving distance L is calculated for each machining block. A calculated feed rate is then calculated by dividing this moving distance L by a predetermined tolerable minimum moving time Ta. A command feed rate is compared to the calculated feed rate, and the actual feed rate is set to the calculated feed rate if the command feed rate is larger than the calculated feed rate.

In accordance with one embodiment of the present invention, the tolerable maximum feed rate Fd is set to the calculated feed rate in real time during operation based on the tolerable minimum moving time Ta to be determined by the data Interpretation and the like and the moving distance L of each machining block. If the command feed rate Fc exceeds the tolerable maximum feed rate Fd, the actual feed rate for the block is set to the tolerable maximum feed rate Fd, thereby realizing smooth deceleration and preventing mechanical shock of the machine tool and reduction in machining accuracy.

In accordance with another aspect of the present invention, required time for each processing element is determined in advance, the sum of processing times corresponding each element is calculated by judging the processing mode element contained in processing for each block. Then, the feed rate is controlled by determining the tolerable minimum moving time for each block based on the calculated sum of processing times. That is, the feed rate is controlled by using the optimum value as the tolerable minimum moving time for each machining block.

In accordance with still another aspect of the present invention, function pattern of a machining block is analyzed and processing time for each analyzed pattern is measured and stored in the memory. When processing the pattern stored in the memory, the processing time is set for the pattern read out of the memory to control the feed rate by calculating the tolerable minimum moving time. In this manner, a high speed feed rate control is realized with efficient and accurate tolerable minimum moving time.

Also, in accordance with yet another aspect of the present invention, NC data for a plurality of machining blocks are stored in a buffer memory. Whenever an open area exists in the buffer, NC data for a new machining block is entered to set the feed rate for the new machining block. A feed rate command curve over the processing blocks in the buffer is generated so that processing is carried out based on this feed rate command curve, thereby eliminating mechanical shock in performing small machining blocks and realizing a high speed machining.

BRIEF DESCRIPTION OF THE DRAWINGS

FIG. 9 shows the relationship between the processing unit affecting the processing time and the required processing time in the second embodiment of the present invention.

FIG. 11 is a block diagram to perform the feed rate control method of the third embodiment in FIG. 10.

FIG. 12 shows the relationship between the particular NC program in the third embodiment and the processing time.

DESCRIPTION OF THE PREFERRED EMBODIMENTS

Now, the present invention will be described in detail by reference to the accompanying drawings.

Figure 1:
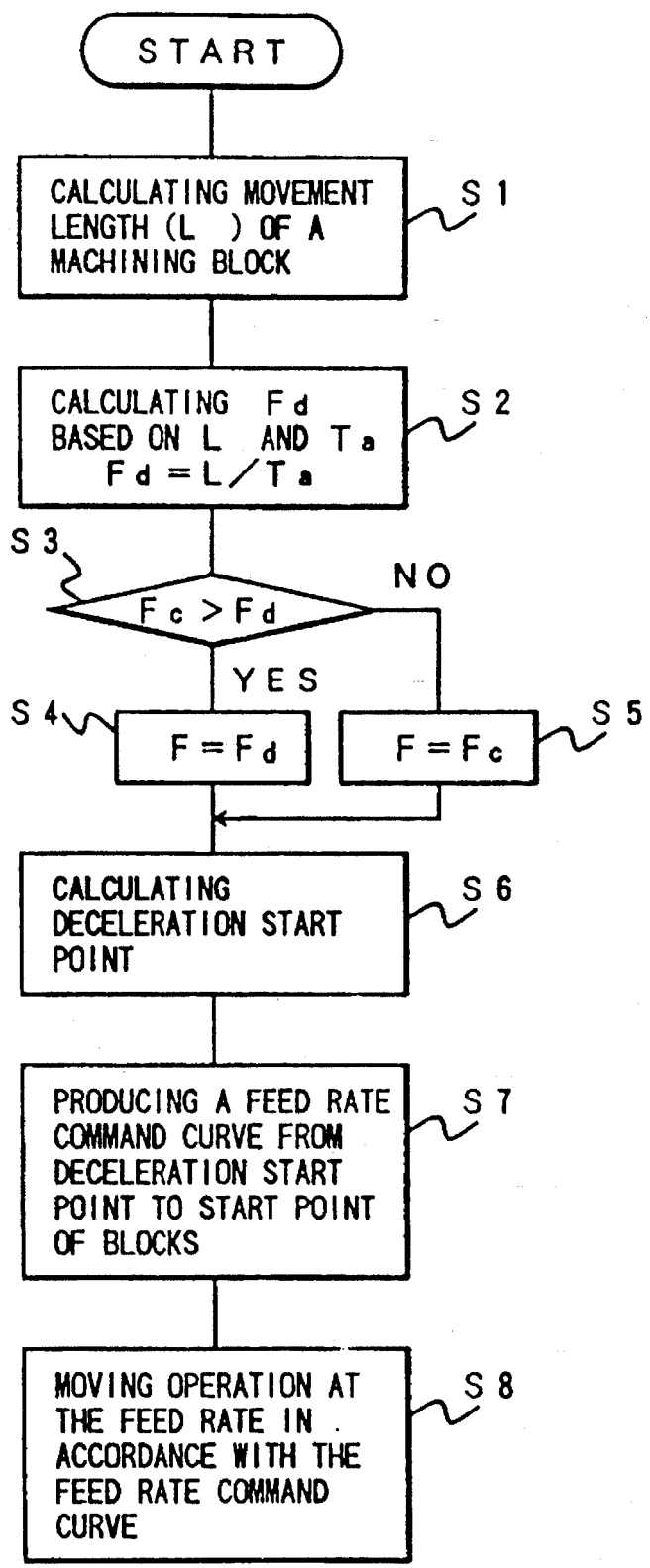
FIG. 1 is a flowchart to show operation steps of one embodiment of the feed rate control method and apparatus in numerical control system according to the present invention.
Figure 2:
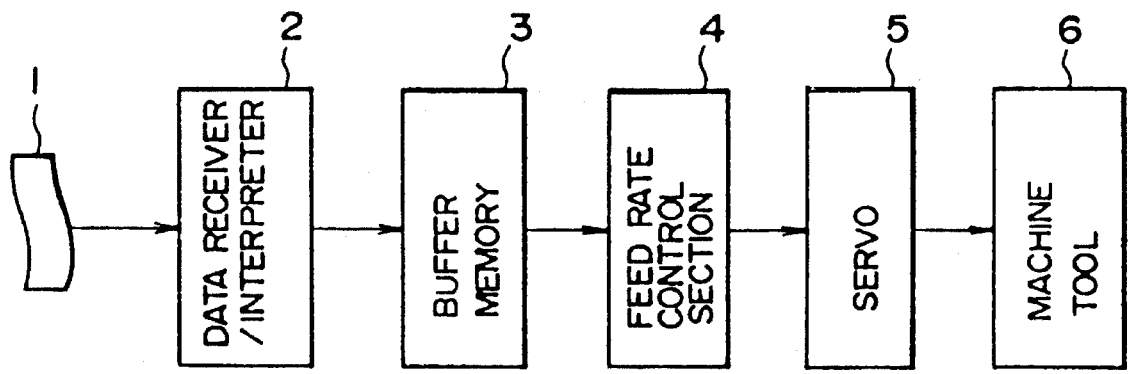
FIG. 2 is a block diagram of one embodiment of the feed rate control apparatus in numerical control system in accordance with the present invention.

Illustrated in FIG. 1 is a flowchart of operating steps of one embodiment of the feed rate control method and apparatus in numerical control according to the present invention. FIG. 2 is a block diagram of the feed rate control apparatus.

In FIG. 2, data from an NC tape 1 is received and interpreted by a data receiver/interpreter 2. The interpreted data is stored in a buffer memory 3. The buffer memory 3 is a first-in, first-out type memory to save the interpreted data from the NC tape 1 for a plurality of blocks and send it to a feed rate control section 4 in the order of storage. The feed rate control section 4 calculates machining distance (or the length of movement of the cutting tool) L based on the data supplied from the buffer memory 3. The obtained distance data L and the tolerable minimum moving time Ta corresponding to the minimum interpretation time are used to obtain the tolerable maximum feed rate Fd. The obtained feed rate Fd and the command feed rate Fc are compared to set the actual feed rate F equal to Fd if Fc is larger than Fd. A machine tool 6 is controlled by sending a control signal to a servo section 5 to effect deceleration so as to reach the see actual feed rate.

An operation of one embodiment of the present invention will be described by reference to FIG. 1.

Firstly, the length of movement (L) of a block in the NC program is calculated based on the data from the NC tape 1 (Step S1). The tolerable maximum feed rate Fd is calculated from the obtained length of movement L and the tolerable minimum moving time Ta by the equation Fd=L/Ta (Step S2). Then, comparison is made if the command feed rate Fc is larger than the calculated Fd (Step S3). If Fc is larger than Fd, the actual feed rate (or target feed rate) F is set to Fd (Step S4). If Fc is smaller than Fd, F is set to Fc (Step S5). Subsequently, a deceleration start point in the moving zone in the blocks stored in the buffer memory 3 is calculated based on the command speed slope to be determined by the acceleration/deceleration parameter toward the target feed rate F for the blocks (Step S6). A feed rate command curve from the deceleration start point to the start point of the blocks is generated (Step S7). The processing operation is performed by controlling the feed rate in accordance with the feed rate command curve (Step S8).

Figure 3:
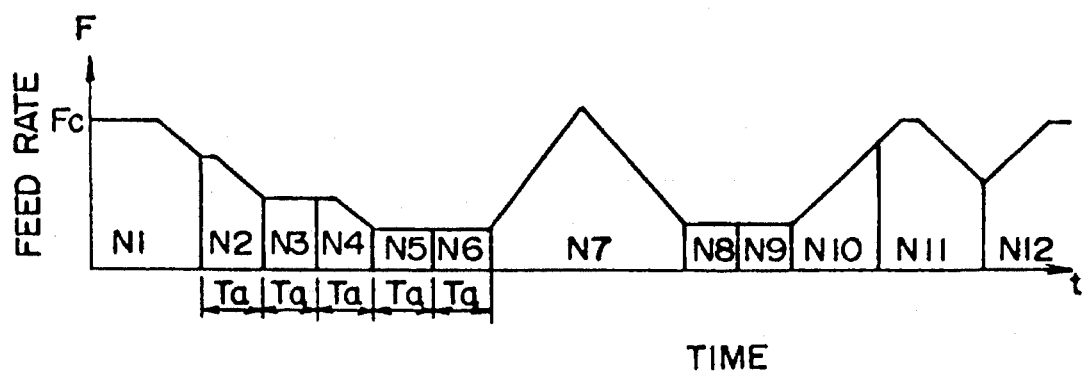
FIG. 3 is a graph to show the change in feed rate in each block of one embodiment of the present invention.
Figure 4:
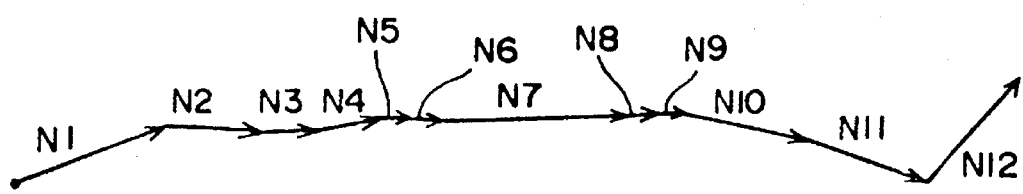
FIG. 4 is an example of the path of movement of a cutting tool in numerical control machining.
Figure 5:
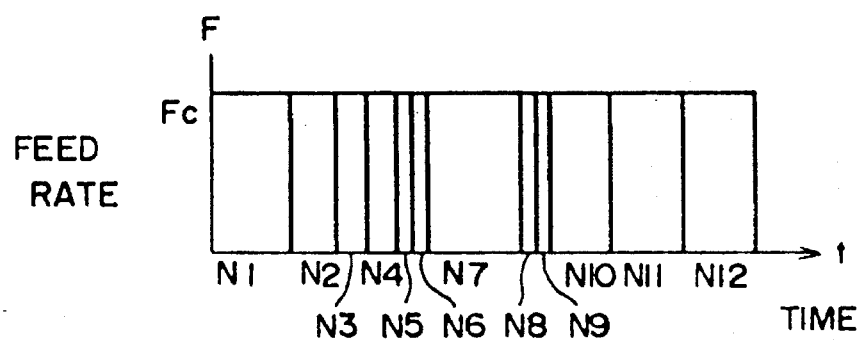
FIG. 5 shows a relationship between the program command feed rate and a block time in the example as illustrated in FIG. 4.
Figure 6:
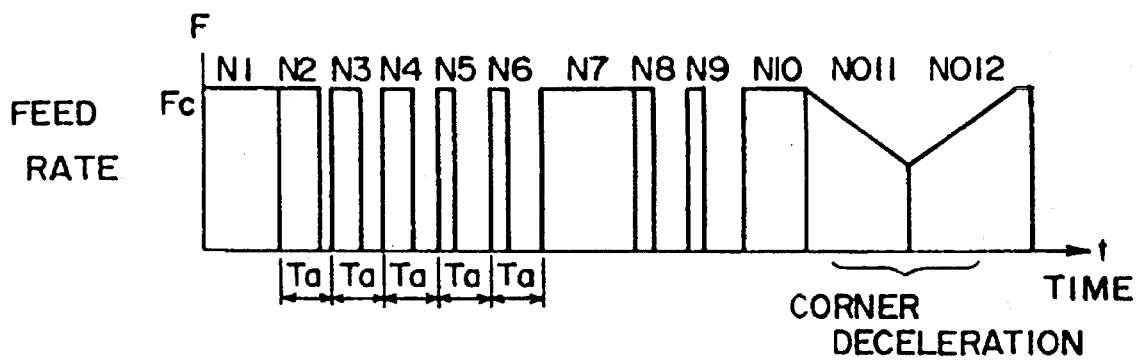
FIG. 6 shows the change in actual feed rate in the example in FIG. 5 derived from a conventional method and apparatus.

Illustrated in FIG. 3 is a graph of the change in feed rate for each block. As apparent from FIG. 3, the feed rate is reduced in this particular embodiment to secure the minimum data interpretation time in blocks such as N2 through N6, N8 and N9 in which the block moving distance (or block operation time) is short.

In the feed rate control method in the first embodiment as mentioned above, the actual feed rate is set to the tolerable maximum feed rate Fd if the moving command feed rate Fc exceeds the tolerable maximum feed rate Fd. As for the block tolerable minimum moving time, set in the NC apparatus as particular value is the estimated actual processing time multiplied by a certain safety factor.

However, the tolerable minimum moving time varies over a wide range depending on the machining program defining, for example, the content of arithmetic operations, shape of the workpiece to be machined, and the like. Nevertheless, the tolerable minimum moving time is set as fixed value which is considerably large taking safety into consideration.

In a second embodiment of the present invention, the tolerable minimum moving time is made variable depending on the content of the machining program. The feed rate control method according to such second embodiment is described hereunder by reference to FIGS. 7 through 9.

Figure 7:
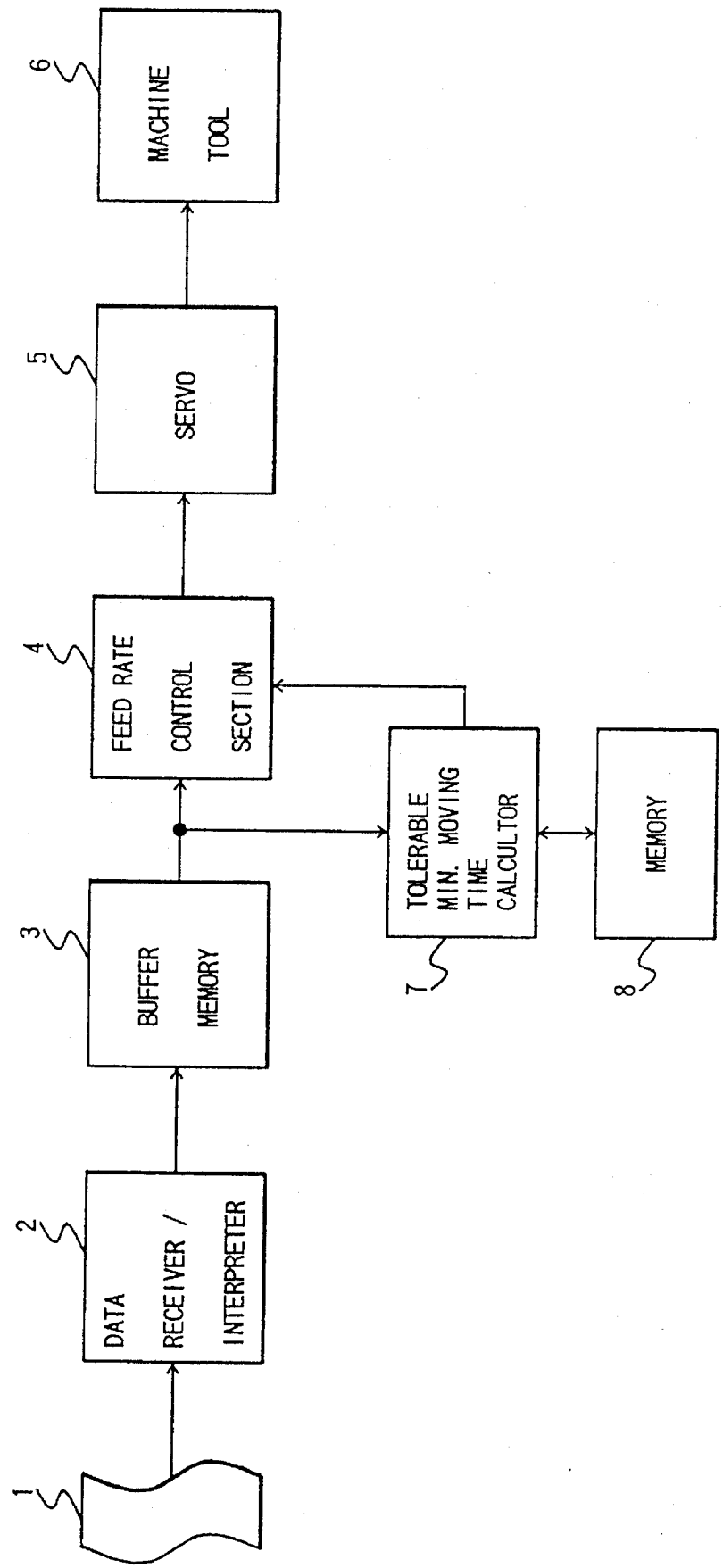
FIG. 7 is a block diagram of a second embodiment of the feed rate control apparatus in numerical control system according to the present invention.

FIG. 7 illustrates a block diagram of the second embodiment of the feed rate control apparatus in numerical control according to the present invention. On the other hand, illustrated in FIG. 8 is a flowchart of the feed rate control steps therefor.

In FIG. 7, data from the NC tape 1 is received and interpreted by the data receiver/interpreter 2. The interpreted data is stored in the buffer memory 3 which is a first-in, first-out (FIFO) memory to save the interpreted data for a plurality of blocks from the NC tape 1 to be sent out to the Feed rate control section 4 in the sequence of storage. The feed rate control section 4 send a control signal to the servo section 5 for feed rate control in the manner as described hereunder based on the data from the buffer memory 3. The servo section 5 controls the machine tool 6 in the above specified control manner on receiving the control signal.

As mentioned above, the arithmetic operation time varies depending on the shape and type of machining. Accordingly, in this embodiment of the present invention, processing times for the elements to be affected by the shape and type of machining are stored in a memory in advance for each block. The tolerable minimum processing time in actual arithmetic operation is calculated based on the processing time for the elements included in the block read out of the memory.

Figure 8:
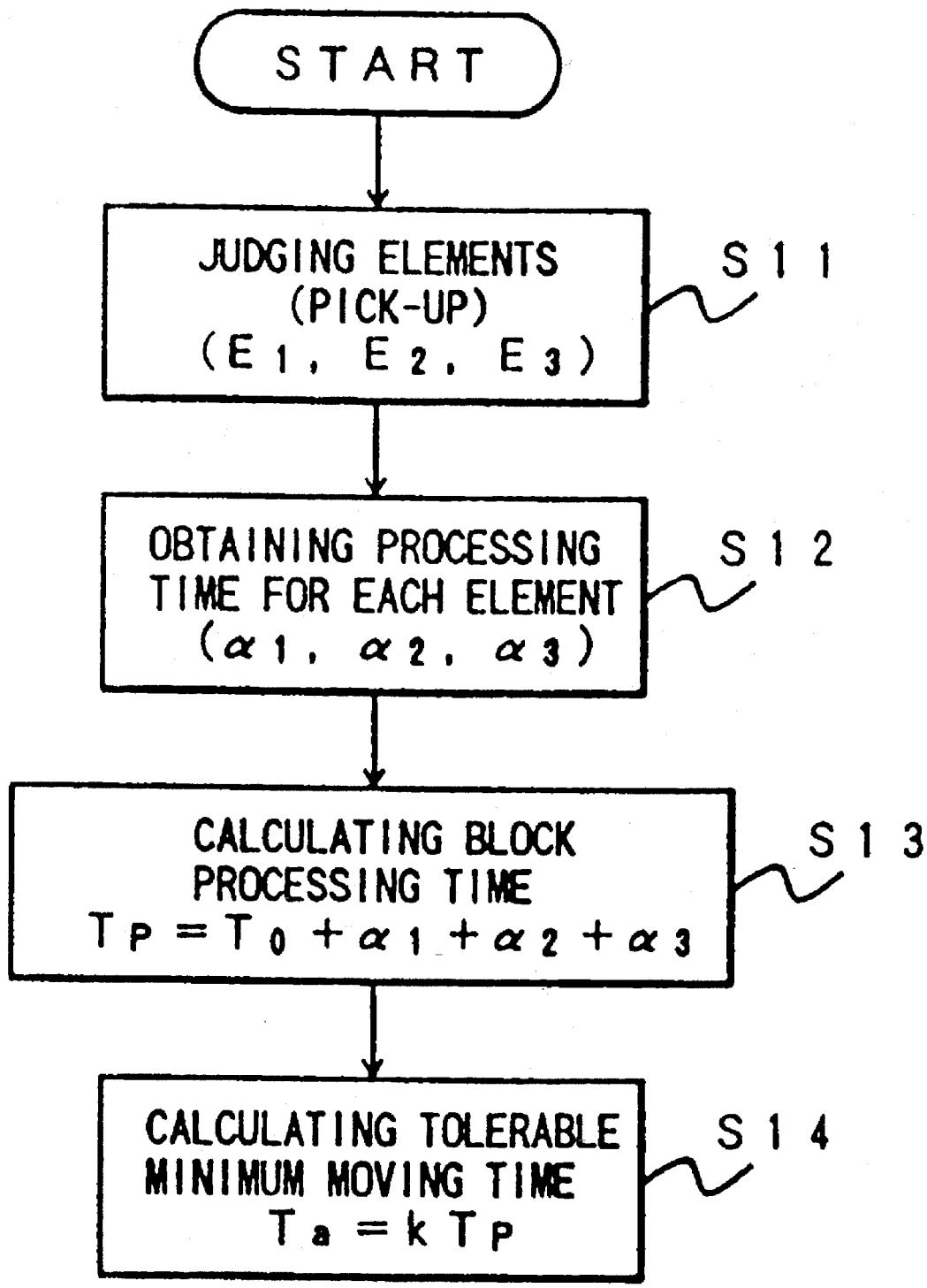
FIG. 8 is a flowchart of the operation steps in the second embodiment of the feed rate control method in numerical control system according to the present invention.

Referring now to FIG. 8, a judgement is first made on the processing time variable elements in the machining program (e.g., E1, E2 and E3) (Step S11). The processing time (e.g., $\alpha 1$, $\alpha 2$ and $\alpha 3$) For each judged element is obtained by reading out of the memory (Step S12). Then, additional processing times obtained for each element in the Step S2 are added to the basic processing time To (a time required for processing a single axis command program in linear interpolation) to obtain the block processing time $Tp=To+\alpha 1+\alpha 2+\alpha 3$ (Step S13). The tolerable minimum moving time Ta is obtained by multiplying a predetermined minimum safety factor k to the block processing time Tp (Step S14):

$$Ta=k \cdot Tp \text{ (where, } k \geq 1)$$

The use of the above tolerable minimum moving time Ta ensures smooth and high speed machining as described in the above first embodiment.

FIG. 9 shows the relationship between arithmetic processing elements in the NC program units and the processing time required for each element. In FIG. 9, the element element Eo requires the processing time To defined as the basic processing time for a single axis command program by linear interpolation (represented by G01 in G code). The element E1 is a double axis linear interpolation command requiring the processing time $\alpha 1$. The element E2 is a 3-axis linear interpolation command requiring the processing time $\alpha 2$. The element E3 is an arcuate interpolation command (G02/G03) requiring the processing time $\alpha 3$. Processing times for elements E4 through E13 are defined in the similar manner as shown in FIG. 9. The elements E1 through E13 are processing requiring increased time to process the program commands. Also shown in FIG. 9 are elements E20, E21, E22, etc. requiring increased processing time due to added functions. That is, the element E20 is a simultaneous 4 control axis processing (processing time $\alpha 20$), the element E21 is a simultaneous 5 control axis processing (processing time $\alpha 21$) and the element E22 is an interactive editing processing (processing time $\alpha 22$).

The processing time for each element in FIG. 9 is saved in the memory 8 in FIG. 7. The tolerable minimum moving time (Ta) calculation section 7 calculates the tolerable minimum moving time Ta based on the block data read out of the buffer memory 3. The Ta is, then sent to the feed rate control section 4 as a control signal for feed rate control operation.

For example, let's assume that the program command a linear 2 axis interpolation (element E1) and a correction of tool diameter (element E6) for a certain block and that simultaneous 4 axis control (element E20) is annexed, the processing times $\alpha 1$, $\alpha 6$ and $\alpha 20$ for the elements E1, E6 and E20 are read out of the memory 8. The program block processing time Tp for the block is obtained by adding these processing times $\alpha 1$, $\alpha 6$ and $\alpha 20$ to the basic processing time To. That is, $$Tp=To+\alpha 1+\alpha 6+\alpha 20$$

k·Tp which is the program block processing time Tp multiplied by a safety factor k is set as the tolerable minimum moving time Ta for performing the feed rate control. Similarly, the total processing time for the elements contained in the command processing program in other blocks is calculated and multiplied by the safety factor to obtain the tolerable minimum moving time for feed rate control.

Now, a third embodiment of the present invention for setting the tolerable minimum moving time by another method is described by reference to FIGS. 10 through 12.

Figure 10:
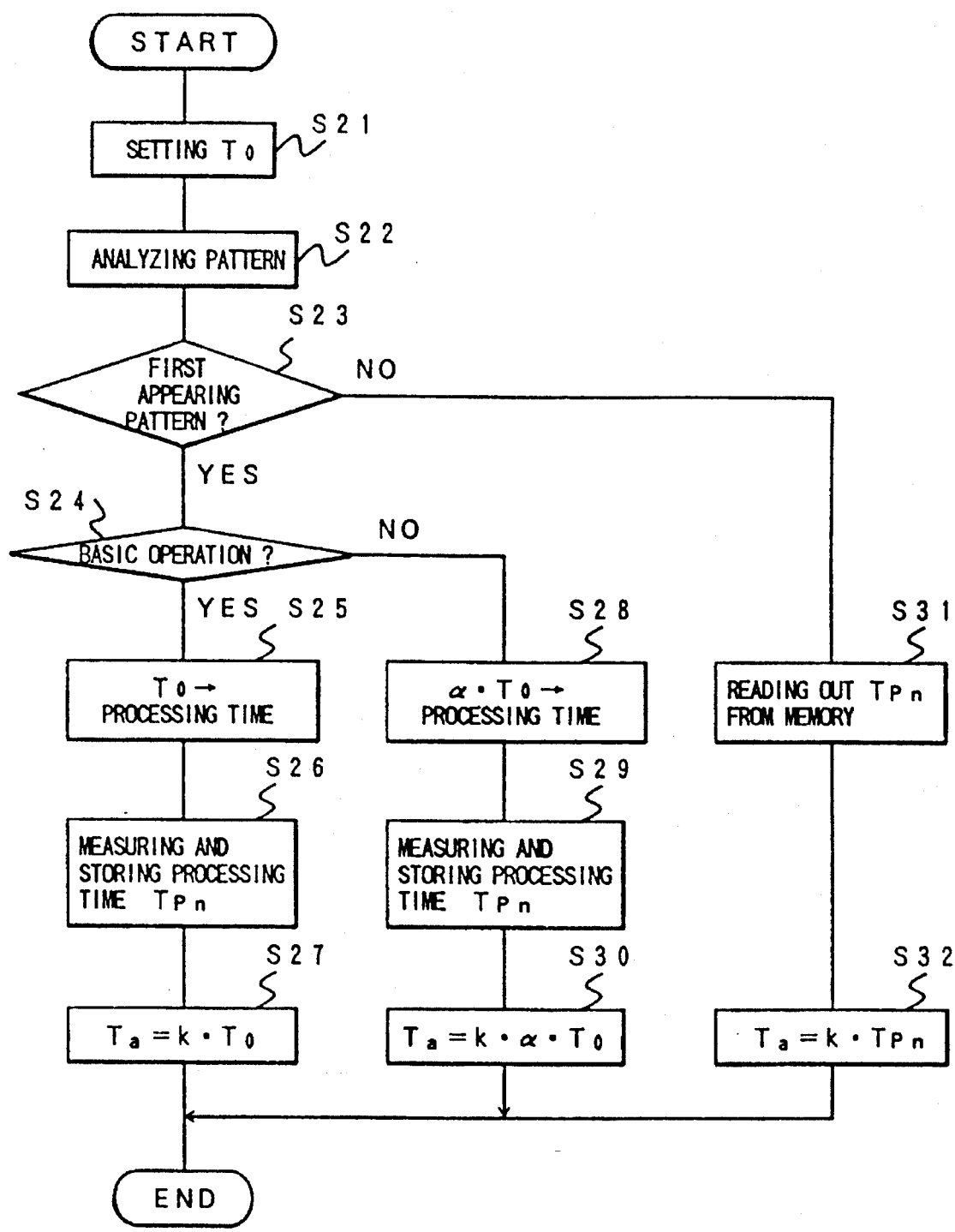
FIG. 10 is a flowchart of processing steps of a third embodiment of the feed rate control method in numerical control system in accordance with the present invention.

FIG. 10 is a flowchart of processing steps of one embodiment of the feed rate control method in numerical control of the present invention.

Firstly, a block processing time for a predetermined basic operation such as, for example, a single axis linear interpolation (pattern 1) is set as an initial value To (Step S21). Followed by the Step S21 is to analyze an additional function machining block by the interpreter (Step S22). A judgement is made if the interpreted pattern is the first appearing pattern (Step S23). If it is a first appearing pattern, a judgement is made to determine if the pattern is the basic operation (pattern 1) (Step S24). If it is the basic operation, the block processing time is set to To (Step S25) to perform the machining. At that time, a real processing time of the machining block is measured. The measurement is stored in the memory as an accurate processing time Tp1 for the above pattern 1 (Step S26). Then, the tolerable minimum moving time Ta is calculated by the equation Ta=k·To (Step S27). Where, k is set to a predetermined factor slightly larger than 1.

On the other hand, in the Step S24, if It is judged not to be the basic operation (any pattern n other than the pattern 1), the block processing time is determined to be α·To, or the time To multiplied by the safety factor α (which is normally set to about 2 to 3 assuming the worst case) (Step S28). The machining is carried out in the same manner as Step S26 and the actual processing time for the block is measured. The accurate processing time Tpn for the above pattern n is stored in the memory (Step S29). The tolerable minimum moving time Ta is calculated by the equation Ta=k·α·To (Step S30).

If it is determined in Step S23 not to be the first appearing pattern, the stored accurate processing time Tpn corresponding to the function pattern of the machining block is read out of the memory (Step S31). The tolerable minimum moving time Ta is calculated by the equation Ta=k·Tpn (Step S32). The machining is carried out in accordance with the tolerable minimum time Ta calculated in the above manner.

Illustrated in FIG. 11 is a block diagram of the NC apparatus to perform the operations in FIG. 10. In FIG. 11, the data from the NC tape 1 is received and interpreted by the data receiver/interpreter 2. The interpreted data is stored in the buffer memory 3.

The machining program block read out of the buffer memory 3 is analyzed by the pattern analyzer 10 to obtain function combined patterns. A processing time determination section 11 determines the processing time based on the processing and the memory content in Steps S27 and S30 in FIG. 10. A processing time measurement section 12 measures the processing times in Steps S26, and S29, and the measurements are stored in a memory 13. In this manner, the tolerable minimum moving time calculation section 14 calculates the tolerable minimum moving time Ta based on the processing time determined by the processing time determination section 11 and sends out the Ta to the feed rate control section 4. The servo section 5 receives the control signal to control the machine tool 6 in the above specified control mode.

Illustrated in FIG. 12 is the relationships of the above NC program, the functional pattern, the processing time to be used, and the measurements of the processing time.

The processing pattern #1 in the NC program is the pattern 1 for a single axis linear interpolation processing and is the basic operation in this example. The processing time is a relatively large initial value To. It is shown that the actual processing time measurement of this machining is Tp1. The measurement Tp1 is stored in the memory 13 as the machining time corresponding to the pattern 1. Also, the next machining block #2 is a single axis linear interpolation (pattern 1). As a result, the processing time Tp1 for the pattern 1 is read out of the memory 13 and is applicable to the usable processing time. The machining block #3 is a dual (2) axis linear interpolation processing (pattern 2) and is different from the pattern 1. The usable processing time is determined to be α·To and the measured processing time Tp2 obtained from the actual machining is stored in the memory 10. The machining block #4 is an arcuate interpolation and is a different pattern 3 from the previous patterns. The usable processing time is set to α·To and the measured processing time Tp3 obtained in the actual machining is stored in memory 13. Similarly, machining blocks #5 and #6 are single axis linear interpolation plus tool diameter correction processing and a dual axis linear interpolation plus tool diameter correction processing different from the above patterns. Thus, the usable processing time is set to α·To and the measured processing times Tp4 and Tp5 are stored in the memory 13.

The next appearing machining block #7 is a dual axis linear interpolation plus tool diameter correction processing and is identical to the pattern 5 appeared in the machining block #6. In this case, the usable processing time Tp5 is read out of the memory 13. Similarly, the machining blocks #8, #9, #10 and #11 are respectively the single axis linear interpolation plus tool diameter correction pattern 4, the dual axis linear interpolation pattern 2, the arcuate interpolation pattern 3 and the single axis linear interpolation pattern 1. Accordingly, Tp4, Tp2, Tp3 and Tp1 are read out of the memory 13 as the processing times. The tolerable minimum moving time is set based on the processing times obtained in this manner for the feed rate control.

The processing as described in the above first embodiment is carried out based on the tolerable minimum moving time Ta obtained in the above manner, thereby ensuring smooth and high speed machining.

In order to perform the feed rate control of the above first embodiment, it is always necessary to accelerate or decelerate If deceleration differs for each machining block, thereby causing adverse effects on the machining surface or the machine tool. Also, if there is even one miniature machining block among a large number of machining blocks, the machining speed is affected because the feed rate must be reduced to the tolerable rate for the particular machining block.

A fourth embodiment of the Feed rate control method and apparatus to overcome these problems is described hereunder by reference to FIGS. 13 through 16.

Figure 13:
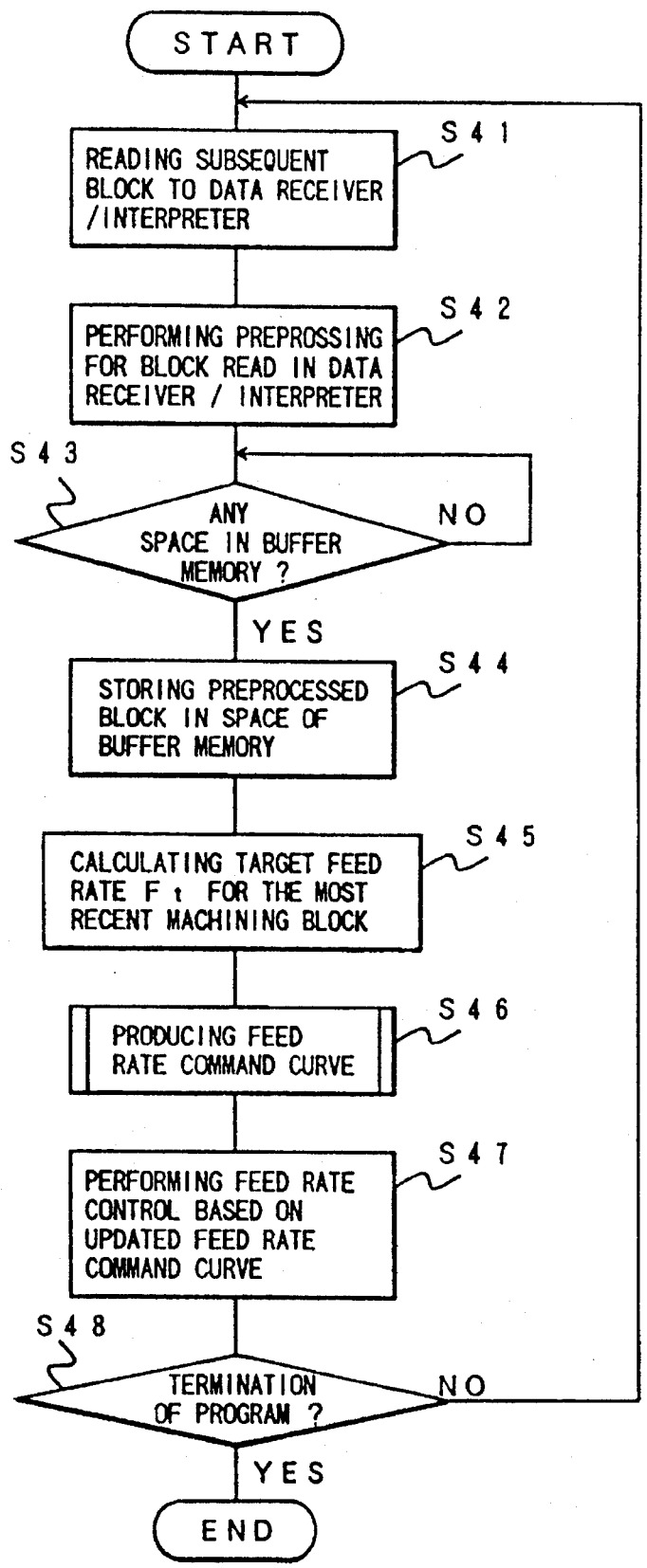
FIG. 13 is a flowchart of the operation steps of a fourth embodiment of the feed rate control method and apparatus in numerical control system of the present invention.

Illustrated in FIG. 13 is a flowchart of operation step of the feed rate control method and apparatus according to the present invention. A block diagram of the apparatus is the same as FIG. 2.

A description is repeated by reference to FIG. 2. Data from the NC tape 1 is received and interpreted by the data receiver/interpreter section 2. And the interpreted data is stored in the buffer memory 3 which is an FIFO type memory to save the interpreted data from the NC tape 1 for a plurality of blocks and sent to the feed rate control section 4 in the sequence of storage. The feed rate control section 4 sends the control signal to the servo section to carry out the feed rate control as described hereunder in response to the data supplied from the buffer memory 3. The servo section 5 receives the control signal to control the machine tool 6 in the specified control mode.

Figure 14:
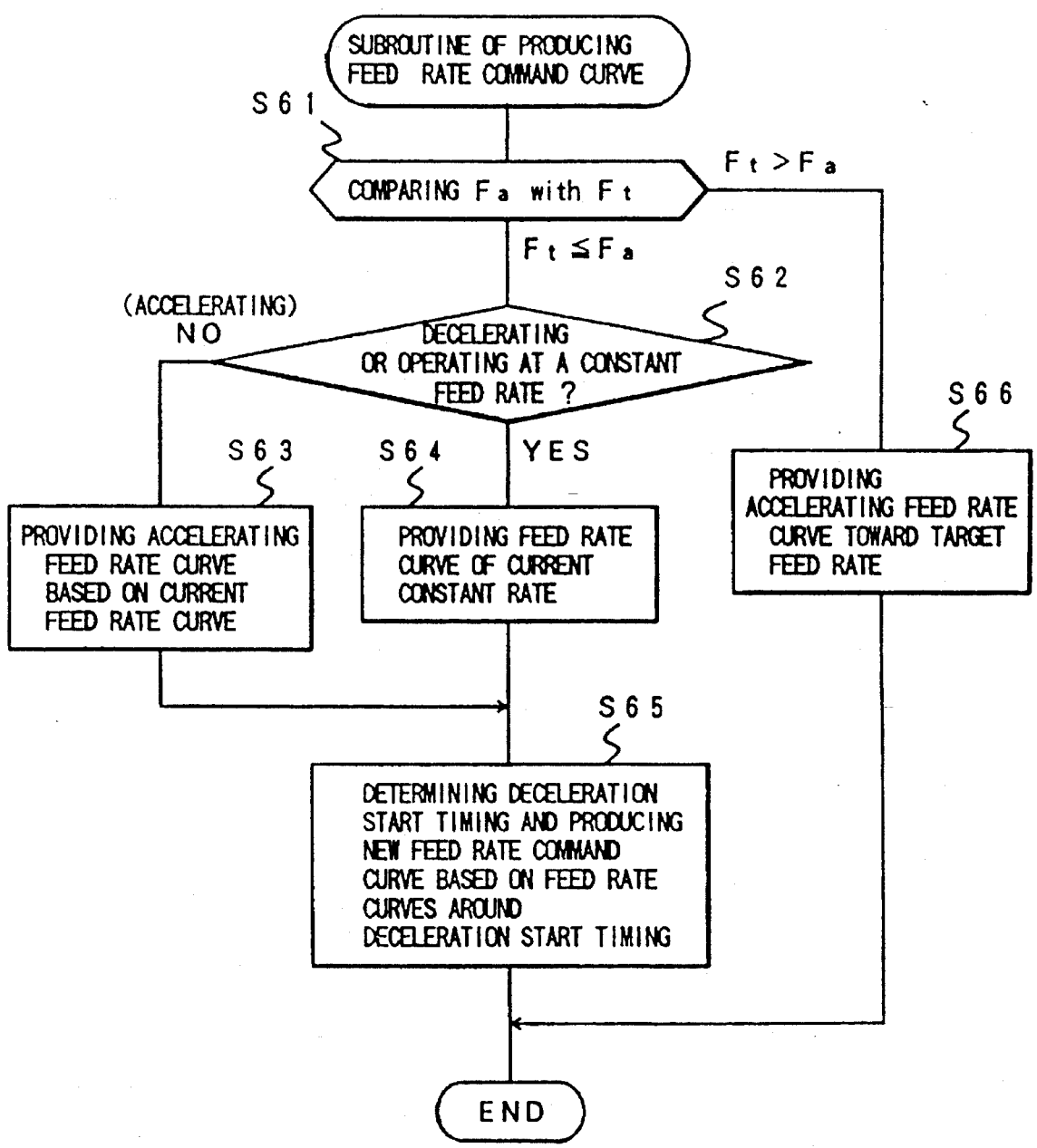
FIG. 14 is a flowchart of steps of generating the feed rate command curve in the fourth embodiment in FIG. 13.

FIG. 13, the receiver/interpreter section 2 reads in the data for the subsequent machining block to interpreter (Step S41). Subsequently, preprocessing such as conversion into the numerical control format, arithmetic operations of the moving distance data are carried out (Step S42). Then, a judgement is made if there is any space in the buffer memory (Step S43). If there is space area, the preprocessed machining block data is saved in the space area in the buffer (Step S44). A target feed rate Ft for the most recent machining block saved in the buffer is calculated (Step S45). Then, the processings as illustrated in FIG. 14 are followed to compare the current feed rate Fa and the calculated most recent target feed rate Ft. The comparison result is used to generate the feed rate command curve to accelerate or decelerate control in a predetermined mode toward the target feed rate over the machining blocks in the buffer (Step S46). Then, a feed rate control is performed in accordance with the thus obtained updated feed rate command curve (Step S47). Finally, a judgement is made if the program is terminated (Step S48). If not terminated, processing returns to Step S41. The processing ends if determined to be terminated.

The operation processing in the feed rate command curve generation in Step S46 in FIG. 13 is described by reference to the subroutine in FIG. 14.

In order to generate the updated feed rate command curve, it is a first step to compare the currently operating feed rate Fa with the calculated most recent target feed rate Ft (Step S61). If Ft≦Fa, a judgement is made if it is decelerating or operating at a constant feed rate now (Step S62). If the Judgement is "NO" or in an acceleration stage, the feed rate is continued to accelerate in accordance with the current feed rate curve (Step S63). If "YES", the feed rate curve will be constant at the current feed rate (Step S64). The obtained feed rate curve is used to determine the start point to initiate deceleration to reach the target feed rate Ft at the head of the most recent machining block over the machining blocks in the buffer in accordance with the acceleration/deceleration curve determined by the parameter. A new feed rate command curve is generated by combining the feed rate curve up to the deceleration start point and the feed rate curve past the deceleration start point (Step S65).

On the other hand, if judged Ft>Fa in Step S61, an acceleration command is provided curve to accelerate toward the target feed rate over the machining blocks in the buffer based on the acceleration/deceleration curve predetermined by the parameter (Step S66).

An example of steps of generating the feed rate command curve provided with 5 buffers is illustrated in FIG. 15A through 15E. The vertical and horizontal axes in FIGS. 15A through 15E represent feed rate and time respectively. Arrows N6 through N10 below the horizontal axis represent processing timing for the blocks N6 through N10. For example, processing for machining block N6 is carried out in FIG. 15A. A feed rate Ft6 for machining block N6 is determined and instructions are sent to process the machining blocks N1 through N4 at a predetermined feed rate Fc (command feed rate). In machining block N5, a deceleration start point $T_{DA}$ is calculated based on the acceleration (acceleration/deceleration curve) determined by the parameter so that the feed rate Ft6 is reached at the start of machining block N6. A feed rate command curve is obtained to initiate deceleration from $T_{DA}$.

Figure 15A:
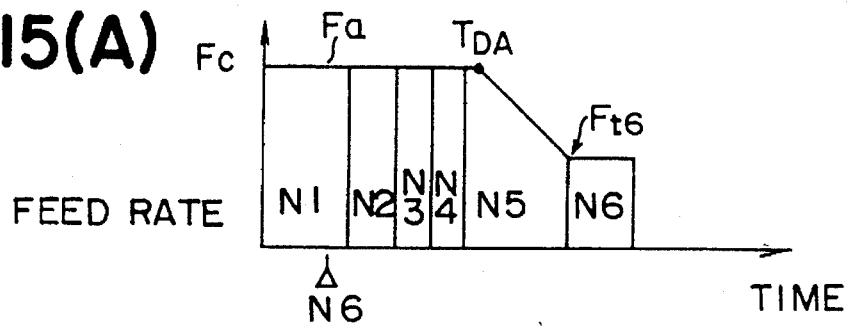
FIGS. 15(A) through 15(E) are graphs of changes in time of the feed rate command curve generation to explain the processing steps in the fourth embodiment.
Figure 15B:
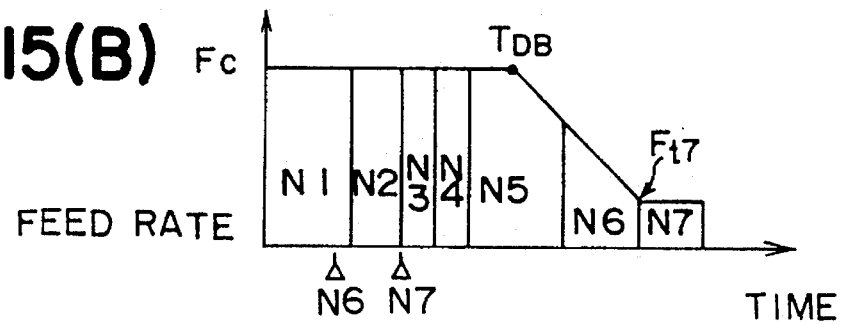
Figure 15C:
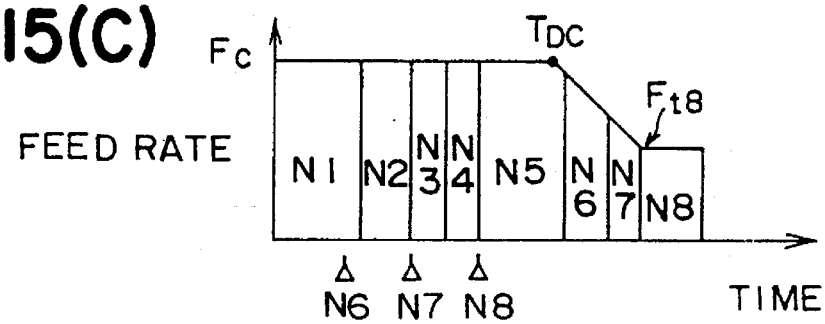
Figure 15D:
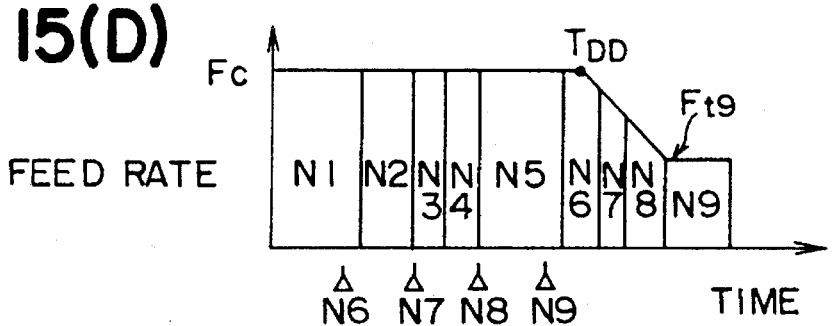

Referring now to FIG. 15B, processing for machining block N7 is carried out in the similar manner. That is, a new deceleration start point $T_{DB}$ (within the processing period for machining block N5) is calculated so that the feed rate Ft7 will be reached at the start of processing of machining block N7. A feed rate command curve is obtained to decelerate at the above acceleration. In FIG. 15C, a deceleration start point $T_{DC}$ is calculated so that the feed rate Ft8 will be reached when carrying out machining block N8 and a feed rate command curve is obtained to initiate deceleration at time $T_{DC}$. Similarly, in FIG. 15D, machining block N9 is carried out to obtain the feed rate Ft9 for machining block N9 and deceleration operation is initiated at the deceleration start point $T_{DD}$ (within the processing period for machining block N6).

Figure 15E:
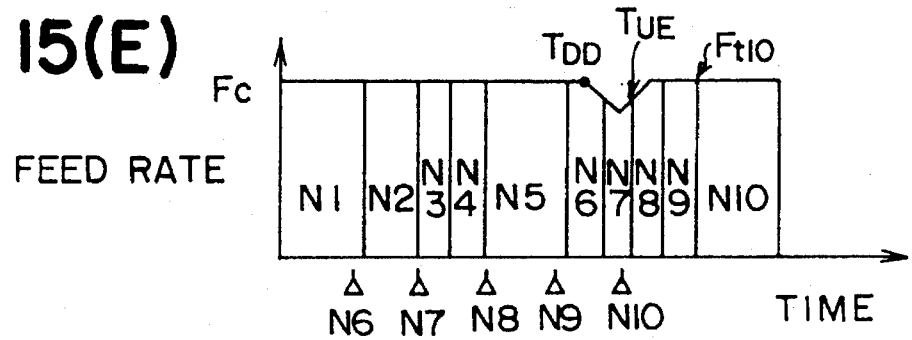

Now, in FIG. 15E, feed rate Ft10 for machining block N10 is obtained while carrying out machining block N7. Since the feed rate Fa at this (present) time is in deceleration and Ft10 is higher than Fa, a feed rate command curve is obtained to enter acceleration mode at time $T_{UE}$ based on the above acceleration.

The above described processing not only eliminates mechanical shock in carrying out continuous small machining blocks but also ensures high speed machining.

A high speed machining is particularly responsible for processings S62 through S64 in FIG. 14. This will be described in detail by reference to FIG. 16A through 16F showing a similar relationship to FIG. 15.

Figure 16A:
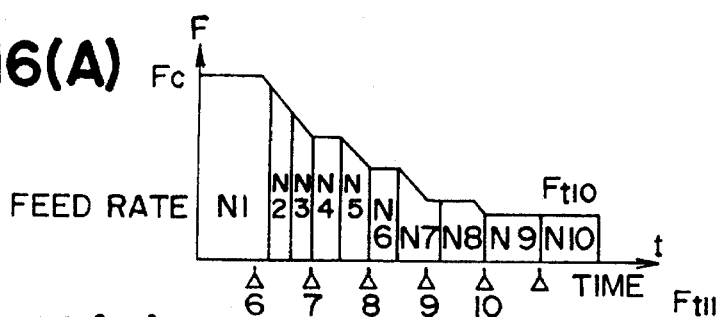
FIGS. 16(A) through 16(F) are graphs of changes in time of the rate command curve generation for high speed processing by the fourth embodiment.
Figure 16B:
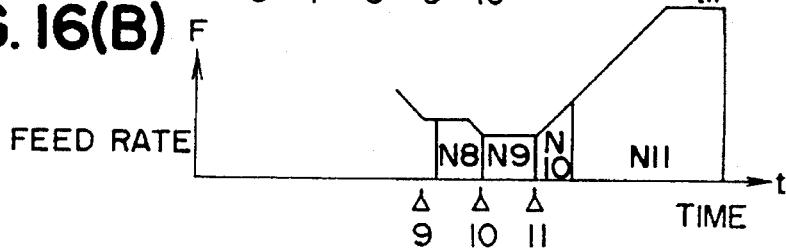
Figure 16C:
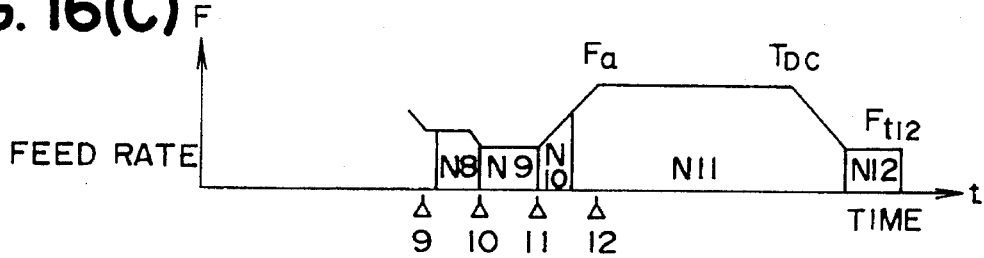
Figure 16D:
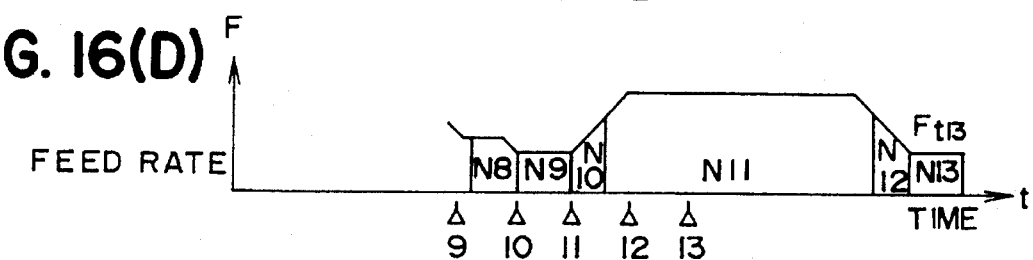

In FIG. 16A, processing feed rate Ft10 is obtained by carrying out machining block N10 among machining blocks N1 through N10. A feed rate command curve is obtained based on the NC data for machining blocks N6 through N10 stored in the buffer in FIG. 16B, it is impossible to set the feed rate Ft11 for the long lasting machining block N11 at the beginning of the machining block N11 because the acceleration is constant. Accordingly, it is in the middle of machining block N11 to be set to Ft11. When a feed rate Ft12 lower than the current feed rate Fa is obtained for machining block N12 while processing the machining block N11. It is normal to maintain the constant feed rate Fa if there are no processing steps S62 through S64 in FIG. 14. A deceleration start point $T_{DC}$ is calculated to achieve feed rate Ft12 at the start of the machining block N12 (FIG. 16C). A feed rate command curve is obtained to start deceleration at time $T_{DC}$ and reach feed rate Ft13 for machining block N13 as illustrated in FIG. 16D.

Figure 16E:
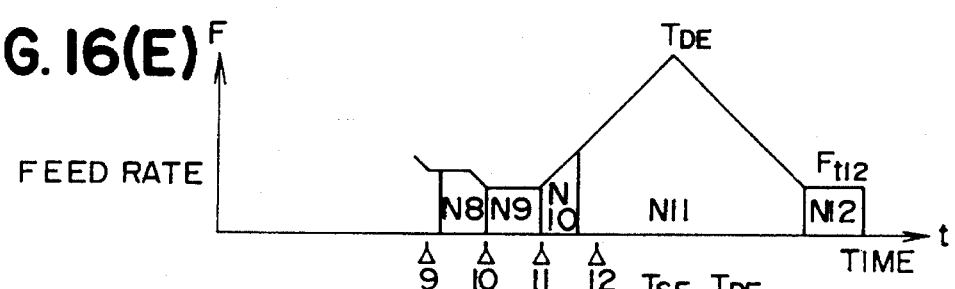
Figure 16F:
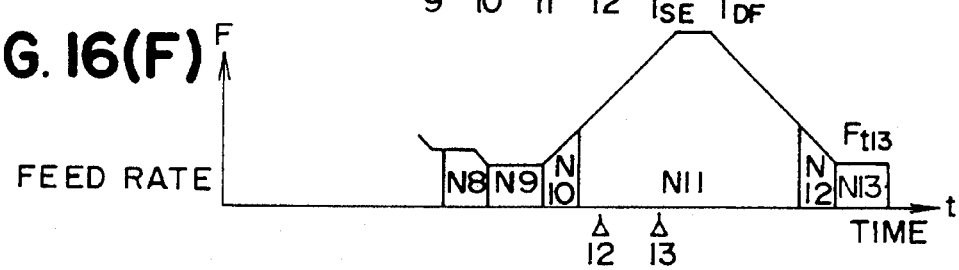

On the other hand, in the present embodiment, if the target feed rate Ft12 to be obtained during processing of the machining block N12 is lower than the current feed rate Fa in the acceleration stage as illustrated in FIG. 16E, a feed rate curve is chosen to continue acceleration in accordance with the current feed rate curve. A deceleration start point $T_{DE}$ is calculated so that the feed rate Ft12 is reached at the processing start point for the machining block N12. Deceleration is initiated at this time When the feed rate Ft13 is obtained by processing the machining block N13, since It is in an acceleration stage as shown in FIG. 16F, a feed rate command curve is generated to continue the acceleration until the time $T_{DE}$ and maintain the feed rate constant until deceleration is initiated at a deceleration start point $T_{DF}$, thereby the feed rate Ft13 is reached at the start of the machining block N13.

As understood from the above description, the feed rate control method and apparatus in numerical control according to the present invention calculates the tolerable maximum feed rate Fd in the real time based on the tolerable minimum moving time Ta to be determined by the data interpretation time and the like and the length of movement of the machining block. If the command feed rate Fc exceeds the tolerable maximum feed rate Fd, the actual feed rate F for the block is set to the tolerable maximum feed rate Fd. As a result, processing can be done in time even for a small moving block which cannot be processed normally, thereby assuring smooth deceleration to avoid mechanical shock to the machine tool and reduced machining accuracy.

Also, in the present invention, the tolerable minimum moving time Ta is obtained in the following manner. Firstly, a required machining time is previously calculated for each processing mode element. Machining mode elements contained in processing in each block are judged and the sum of the processing times for the judged elements is calculated to provide the tolerable minimum moving time Ta. As a result, the feed rate control is efficient to achieve fast feed rate and highly efficient machining.

In another embodiment, the tolerable minimum moving time Ta is obtained in the following manner. Machining blocks are analyzed to determine their function patterns. A time required for processing each analyzed pattern is measured and stored in a memory. When processing a particular pattern the processing time for the pattern is read out of the memory to achieve high feed rate control. This enables to obtain better suited tolerable minimum moving time while machining, thereby eliminating waste time to calculate the tolerable minimum moving time.

Additionally, a feed rate command curve is generated over a plurality of machining blocks in a buffer in such a manner that a new feed rate can be set for a new machining block by storing NC data for a plurality of machining blocks in the buffer memory and sequentially renewing NC data for a new machining block when a space area is available in the buffer memory. The feed rate control is carried out in accordance with the feed rate command curve. This eliminates mechanical shock in processing continuous small machining blocks and enables highly efficient and high speed machining by eliminating waste time.

What is claimed is:

1. A feed rate control method for numerical control (NC) wherein NC data are stored and a plurality of machining blocks are entered in a buffer memory, a length of movement L of a tool is calculated for each machining block, a feed rate Fd is calculated as L/Ta, where Ta is a predetermined tolerable minimum moving time, a command feed rate Fc is compared with Fd and a target feed rate Ft is set to Fd if Fc is larger than Fd and to Fc if Fc is smaller than Fd, the method comprising the steps of:

calculating Ft for a machining block most recently stored in said buffer memory;

comparing the calculated target feed rate Ft for the most recent machining block and a current feed rate Fa;

generating in response to the comparison result, a feed rate command curve over at least one machining block stored in said buffer memory so as to set a feed rate at a beginning of the most recent machining block to Ft in accordance with a predetermined acceleration/deceleration curve from Fa to Ft;

storing another machining block in the buffer memory and returning to the calculating step such that a new feed rate command curve is successively stored in said buffer memory; and controlling the feed rate in accordance with the most recent feed rate command curve.

2. A feed rate control method in accordance with claim 1, wherein said feed rate command curve is generated to accelerate the feed rate toward the calculated target feed rate Ft in accordance with a predetermined acceleration curve if the target feed rate Ft for the most recent machining block is higher than the current feed rate Fa.

3. A feed rate control method in accordance with claim 2, wherein the tolerable minimum moving time Ta is obtained through the following steps:

measuring processing times required for each of a plurality of elements;

detecting elements, of the plurality of elements, contained in each of the machining blocks; and calculating a sum of the processing times for the detected elements.

4. A feed rate control method in numerical control in accordance with claim 2, wherein the tolerable minimum moving time Ta is obtained through the following steps:

measuring processing times required for each of a plurality of elements and storing the measured processing times in a memory;

detecting elements, of the plurality of elements, contained in each of the machining blocks;

reading out processing times corresponding to the detected elements from said memory; and calculating a sum of the processing times read out of said memory.

5. A feed rate control method in accordance with claim 2, wherein the tolerable minimum moving time Ta is obtained through the following steps:

setting an initial value of a processing time for a machining block;

analyzing a plurality of functional patterns, each machining block including at least one functional pattern;

storing in said memory a measured processing time for each analyzed functional pattern by measuring an actual processing time while setting the tolerable minimum moving time Ta for a first appearing occurrence of each functional pattern to the initial value; and reading out the corresponding processing time from said memory to obtain the tolerable minimum moving time Ta when an analyzed functional pattern matches a pattern stored in said memory.

6. A feed rate control method in accordance with claim 1, wherein each feed rate command curve is generated by the following steps:

maintaining the current feed rate if the target feed rate Ft for the most recent machining block is smaller than the current feed rate Fa and if the current feed rate is in either a deceleration or a constant mode; and if Fa is in an acceleration mode, continuing acceleration in accordance with the current feed rate curve and calculating a deceleration start point based on a predetermined acceleration/deceleration curve so that the feed rate reaches, at the beginning of the most recent machining block, the target feed rate Ft for the most recent machining block, thereby intercoupling the feed rate curve up to the deceleration start point and the feed rate curve subsequent to the deceleration start point and up to the most recent machining block.

7. A feed rate control method in accordance with claim 6, wherein the tolerable minimum moving time Ta is obtained through the following steps:

measuring processing times required for each of a plurality of elements;

detecting elements, of the plurality of elements, contained in each of the machining blocks; and calculating a sum of the processing times for the detected elements.

8. A feed rate control method in numerical control in accordance with claim 6, wherein the tolerable minimum moving time Ta is obtained through the following steps:

measuring processing times required for each of a plurality of elements and storing the measured processing times in a memory;

detecting elements, of the plurality of elements, contained in each of the machining blocks;

reading out processing times corresponding to the detected elements from said memory; and calculating a sum of the processing times read out of said memory.

9. A feed rate control method in accordance with claim 6, wherein the tolerable minimum moving time Ta is obtained through the following steps:

setting an initial value of a processing time for a machining block;

analyzing a plurality of functional patterns, each machining block including at least one functional pattern;

storing in said memory a measured processing time for each analyzed functional pattern by measuring an actual processing time while setting the tolerable minimum moving time Ta for a first appearing occurrence of each functional pattern to the initial value; and reading out the corresponding processing time from said memory to obtain the tolerable minimum moving time Ta when an analyzed functional pattern matches a pattern stored in said memory.

10. A feed rate control method in accordance with claim 1, wherein the tolerable minimum moving time Ta is obtained through the following steps:

measuring processing times required for each of a plurality of elements;

detecting elements, of the plurality of elements, contained in each of the machining blocks; and calculating a sum of the processing times for the detected elements.

11. A feed rate control method in numerical control in accordance with claim 1, wherein the tolerable minimum moving time Ta is obtained through the following steps;

measuring processing times required for each of a plurality of elements and storing the measured processing times in a memory;

detecting elements, of the plurality of elements, contained in each of the machining blocks;

reading out processing times corresponding to the detected elements from said memory; and calculating a sum of the processing times read out of said memory.

12. A feed rate control method in accordance with claim 1, wherein the tolerable minimum moving time Ta is obtained through the following steps:

setting an initial value of a processing time for a machining block;

analyzing a plurality of functional patterns, each machining block including at least one functional pattern;

storing in said memory a measured processing time for each analyzed functional pattern by measuring an actual processing time while setting the tolerable minimum moving time Ta for a first appearing occurrence of each functional pattern to the initial value; and reading out the corresponding processing time from said memory to obtain the tolerable minimum moving time Ta when an analyzed functional pattern matches a pattern stored in said memory.

13. A feed rate control apparatus for numerical control (NC) including means for storing NC data in a buffer memory and sequentially entering machining blocks, means for calculating a length of movement L of a tool for each machining block, means for calculating a feed rate Fd as L/Ta, where Ta is a predetermined tolerable minimum moving time, means for comparing a command feed rate Fc of the NC data with the calculated feed rate Fd, and means for setting a target feed rate Ft to the calculated feed rate Fd if the command feed rate Fc is larger than the calculated feed rate Fd and to the command feed rate Fc if the command feed rate Fc is smaller than the calculated feed rate Fd, said feed rate control apparatus comprising:

a first means for calculating the target feed rate Ft for a most recent machining block stored in said buffer memory;

a second means for comparing the calculated target feed rate Ft for the most recent machining block obtained by said first means and a current feed rate Fa;

a third means for generating, in response to the comparison result by said second means, a feed rate command curve over at least one machining block stored in said buffer memory so as to set a feed rate at the beginning of the most recent machining block to the target feed rate Ft in accordance with a predetermined acceleration/deceleration curve from the current feed rate Fa to the target feed rate Ft for the most recent machining block; and a fourth means for replacing said feed rate command curve with a new feed rate command curve for a recent machining block which is successively stored in said buffer memory, and controlling the feed rate in accordance with the generated recent feed rate command curve.

* * * * *